United States Patent [19]

Wright

[11] Patent Number: 4,526,075
[45] Date of Patent: Jul. 2, 1985

[54] POTATO PROCESSING APPARATUS

[76] Inventor: Raymond G. W. Wright, 14 Willow Way, Hauxton, Cambridgeshire, CB2 5JB, England

[21] Appl. No.: 389,786

[22] Filed: Jun. 18, 1982

[30] Foreign Application Priority Data

Jun. 19, 1981 [GB] United Kingdom ............... 8119057

[51] Int. Cl.³ .......................................... B65G 47/26
[52] U.S. Cl. .................................. 83/409.1; 83/418; 198/382; 198/774
[58] Field of Search ............... 83/401, 409, 409.1, 83/409.2, 732, 418, 420, 407; 198/382, 396, 774

[56] References Cited

U.S. PATENT DOCUMENTS

| | | | |
|---|---|---|---|
| 1,745,001 | 1/1930 | Bates | 83/409.1 |
| 1,758,587 | 5/1930 | Smith | 83/409.1 X |
| 1,942,538 | 1/1934 | Cutler | |
| 3,078,891 | 2/1963 | Rianda | 83/409.1 X |
| 3,114,403 | 12/1963 | Rianda | 83/407 |
| 3,124,186 | 3/1964 | Siems | 83/407 |
| 3,155,218 | 3/1964 | Creed | |
| 3,357,538 | 12/1967 | Chamberlin | 198/773 X |
| 3,543,928 | 12/1970 | Green | 209/73 |
| 3,561,582 | 2/1971 | Smith | 198/773 X |
| 3,651,925 | 3/1972 | Green | 198/773 |
| 3,708,053 | 1/1973 | Anderson | |
| 3,721,145 | 3/1973 | Lazzarini | 83/732 |
| 3,796,146 | 3/1974 | Lacey | 99/514 |
| 3,923,143 | 12/1975 | Green | 198/773 |

FOREIGN PATENT DOCUMENTS 422072 of 1971 Australia .
449555 of 1936 United Kingdom .
1276361 of 1972 United Kingdom .

Primary Examiner—James M. Meister

[57] ABSTRACT

A walking beam conveyor 28 feeds potatoes in a direction F to a cutting station where they are cut along planes 41 and 42 into four pieces. The conveyor 28 is pocketed and the pockets are configurated so that they cause each potato on the one hand to become oriented with its larger dimension generally at right-angles to the feeding direction F, and on the other hand to move to a central position transversely of the conveyor 28. Thus, each potato is in a predetermined position when it arrives at the cutting station, so that the four pieces into which it is cut are roughly of equal size.

8 Claims, 11 Drawing Figures

POTATO PROCESSING APPARATUS

This invention relates to potato processing apparatus particularly, though not exclusively, for use in the production of snack food products such as crisps.

In the production of potato crisps, it is necessary for the potatoes after peeling to be graded so that large potatoes can be cut into smaller pieces before being sliced and fried. If such grading and cutting is not performed, then the resultant crisps tend to be large. As a result the crisps are either liable to become trapped in the packet seals during a subsequent packaging operation or alternatively their sharp corners tend to rupture the packet. Conventionally, grading of the potatoes is performed by a conveyor whose flights are formed by a coarse mesh. Smaller potatoes which fall through the mesh are passed on for further processing, while larger potatoes which cannot pass through the mesh are carried along to a cutting station where they are cut into smaller pieces. However, the method involved in cutting the potatoes does not guarantee that the resultant pieces will all be sufficiently small for further processing: for example, the cutting operation may remove only a small sliver from a potato, so that the size of the potato is not reduced by a great amount. For this reason, it is necessary for the cut pieces to be returned to the grading conveyor so that any pieces which are still too large are passed back to the cutting station for further cutting.

As indicated above, the conventional cutting operation often produces slivers of potato rather than cutting the potatoes into roughly equal-sized pieces. These slivers when subsequently sliced are too small to produce a usable product, and often disintegrate during frying, thereby contaminating the frying oil. It is therefore necessary to clean the oil at frequent intervals, or otherwise the system which circulates the oil may become blocked by contaminants. The contamination problem is compounded by small potatoes which, instead of passing through the conveyor mesh during grading, sometimes bounce along the conveyor and reach the cutting station. The pieces into which these potatoes are then cut are often also too small to produce a usable product.

In the above-described conventional grading method, it is still possible for some potatoes which are large in only one dimension to pass end-on through the mesh of the grading conveyor, so that these potatoes are passed on for further processing without first being cut. These potatoes when sliced may produce oversize crisps which can still become trapped in the packet seals, as described above. Therefore, the conventional method of grading and cutting does not provide a complete answer to the above-mentioned problems.

It is an object of the present invention to provide a potato processing apparatus which is capable of overcoming the defects mentioned above.

According to the invention, potato processing apparatus comprises feeding means arranged to feed potatoes to a cutting station and at the same time orient the potatoes so that their longest dimensions lie generally in a predetermined direction which is transverse to the direction of feeding, the feeding means also being arranged to dispose the potatoes in a predetermined position transversely of the direction of feeding, and cutting means at the cutting station arranged to cut the oriented and positioned potatoes in at least one cutting plane which passes generally centrally through said predetermined position.

In this way, the feeding means orients and positions each potato so that the cutting means can cut into at least two roughly equal-sized pieces. These pieces can almost certainly be guaranteed small enough for further processing, so that further grading is unnecessary. Taking this factor into account, the potato processing apparatus preferably further comprises an input station at which the potatoes are received, a grading station which receives the potatoes from the input station and which grades the potatoes into sizes respectively larger and smaller than a predetermined size, the potatoes larger than said predetermined size being directed into a first output channel and the potatoes smaller than said predetermined size being directed into a second output channel, said feeding means receiving the potatoes from the first output channel, and an output station to which the potatoes from the second output channel and the cut potatoes from the cutting station are supplied for further processing.

Desirably, the feeding means is a walking beam conveyor having a plurality of relatively movable pockets which are configurated to promote said orientation and disposition of the potatoes as the latter are conveyed along the conveyor by being transferred from pocket to pocket. For example, the walking beam conveyor means comprises first and second sets of pockets which are relatively movable, the pockets of each set being defined by a series of transversely aligned recesses in a plurality of mutually parallel members, with the members defining the first set of pockets being interleaved with the members defining the second set of pockets.

The recesses can be formed by generally V-shaped slots in upwardly directed edges of the members and extending in said feeding direction. The recesses which form at least some of the pockets can have a pair of opposed edges which are inclined at different angles to the horizontal, the steeper edges facing in one direction in one set of pockets and in the opposite direction in the other set of pockets. Advantageously, for each pocket the recesses in the members disposed centrally of the conveyor are deeper than the corresponding recesses in the members disposed outboard thereof, so that the pockets are generally concave in transverse cross-section.

Conveniently, cutting of the oriented and positioned potatoes is performed simultaneously in two planes which are substantially mutually perpendicular.

The invention will now be further described, by way of example, with reference to the accompanying drawings, in which.

Figure 1:
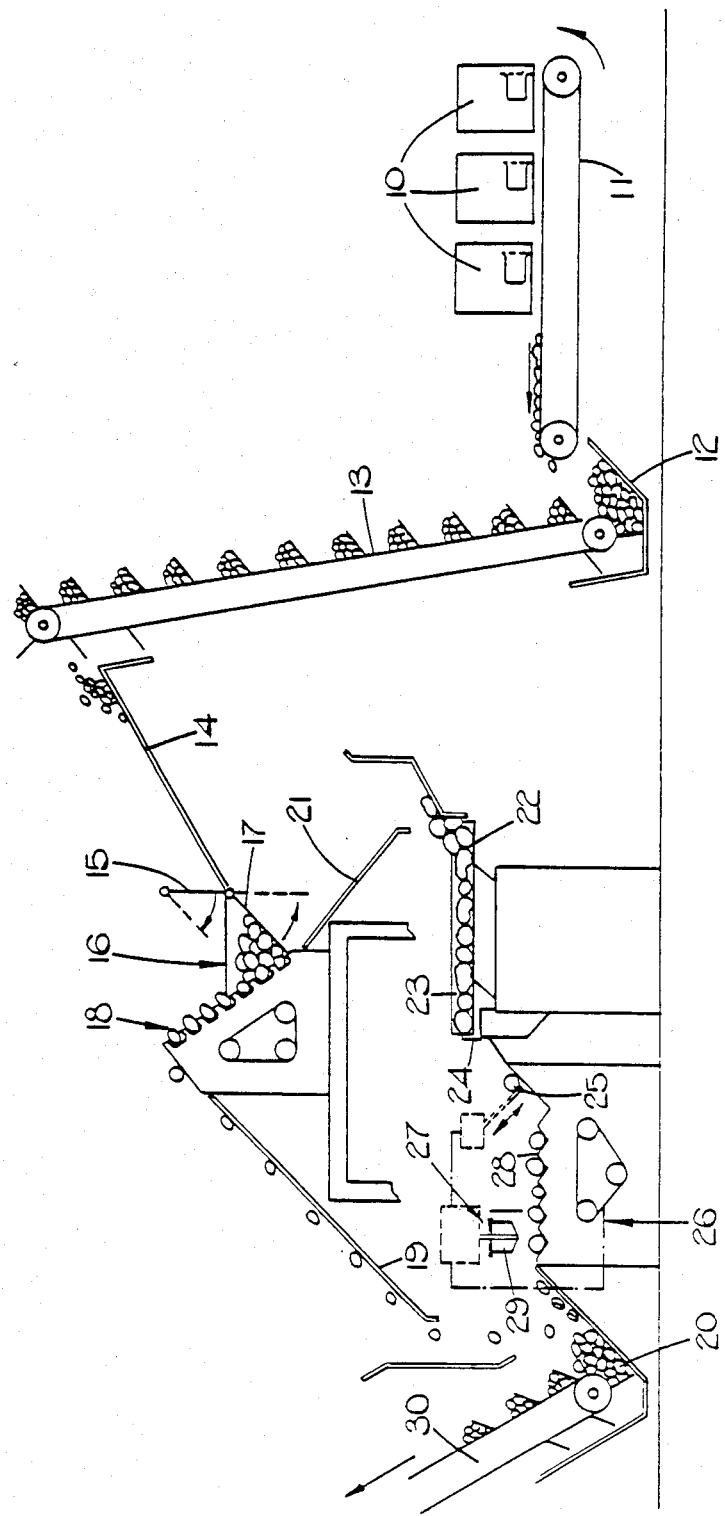
FIG. 1 is a schematic side view of potato processing apparatus according to the present invention.

Referring first to FIG. 1, the apparatus illustrated therein processes potatoes in readiness for the manufacture of a snack food product such as crisps. Initially, potatoes in bulk are supplied to a plurality of (in this case, six) peelers 10, and after peeling therein the potatoes are transported by a conveyor 11 to a hopper 12. A lift conveyor 13 takes the peeled potatoes from the hopper 12 and deposits them at a higher level on a chute 14, whereupon the potatoes roll down the chute and are separated into a plurality of inclined channels. Only one of the channels is shown in the drawings, but it is to be understood that the other channels are identical thereto. At the lower end of each channel, the potatoes come into contact with a gate 15. At timed intervals the gate 15 is opened to allow the potatoes to fall into a hopper 16 where they rest upon another gate 17. At this point, a grader 18 removes all potatoes smaller than a predetermined size from the hopper 16 and deposits them on a chute 19 where they roll and fall under gravity into an output hopper 20. In the particular embodiment illustrated, the grader 18 is in the form of an inclined walking beam conveyor having a series of pockets in which the potatoes are held: only those potatoes small enough to fit in the pockets are transported upwardly by the conveyor, the remaining potatoes being left in the hopper 16. This type of grader forms the subject of our copending U.S. patent application Ser. No. 389,787, filed June 18, 1982, now U.S. Pat. No. 4,466,545, entitled "Article Grading Apparatus".

Figure 9:
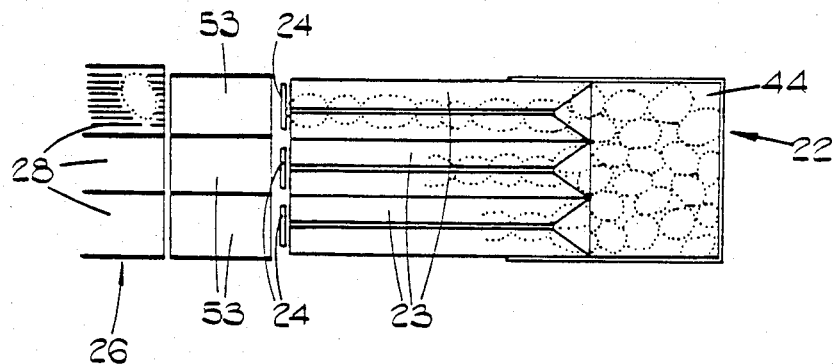
FIG. 9 is a plan view of the vibratory conveyor.

Periodically, the gate 17 is opened to allow the larger size potatoes remaining in the hopper 16 to roll down a chute 21 onto one end of a vibratory conveyor 22, wherein the potatoes are vibrated into single file in each of a plurality of parallel channels 23 (see also FIG. 9). From each channel 23, the potatoes are discharged one at a time under the control of a pair of gates 24 and 25 onto a feeding mechanism 26 which transports the potatoes to a cutting station 27. The feeding mechanism 26 is composed of a plurality of walking beam conveyors 28 (one for each channel of the conveyor 22) and, as will be explained in detail later, during the feeding operation the potatoes are oriented and positioned transversely of the conveyors 28 so that they arrive at the cutting station 27 in a predetermined disposition. At the cutting station 27, a respective cutter 29 cuts the potatoes carried by each conveyor 28 into four roughly equal-sized pieces, which are then discharged into the aforementioned output hopper 20.

It will be appreciated that for each said channel in the chute 14 there is provided a respective hopper 16, grader 18 and chute 19 through which the small-sized potatoes in that channel pass, and also a respective chute 21, vibratory conveyor 22, feeding mechanism 26 and cutting station 27 through which pass the large-sized potatoes in the channel. However, the output hopper 20 is common to all of the channels. From the hopper 20, the potato pieces from the various cutting stations 27 and the whole, small-sized potatoes from the various chutes 19 are transported by a lift conveyor 30 for further processing into the snack food product. In the case of crisps, such further processing would include slicing, quality inspection, frying and packaging.

One of the walking beam conveyors 28 is shown in detail in FIGS. 2 to 6, it being understood that the other conveyors 28 in each feeding mechanism 26 are identical thereto. The conveyor 28 comprises a fixed structure (FIGS. 3 and 4) which includes a plurality of flat members 31 disposed in parallel, transversely spaced-apart relationship and a pair of retaining side walls 32, and a movable structure (FIGS. 5 and 6) which includes a further plurality of flat members 33 disposed in parallel, transversely spaced-apart relationship and interleaved with the members 31. In the illustrated embodiment, six members 31 and seven members 33 are provided, the outermost members 33 being interleaved between the outermost members 31 and the side walls 32.

A plurality of pockets 34 and 35 are provided in the fixed structure, each pocket being formed by respective aligned recesses 36 in upwardly-directed edges of the members 31. The depths of the recesses 36 progressively increase from the outermost to the innermost members 31 so that the pockets 34 and 35 are concave in transverse cross-section, as will be appreciated from FIG. 4. Each of the recesses 36 is generally V-shaped.

In the first three pockets 34 from the input end of the conveyor 28 the edges of each recess 31 are inclined at different angles to the horizontal, the steeper edges facing in the direction in which the potatoes are fed (indicated by arrow F): in the remaining two pockets 35, however, the edges of each recess 31 are symmetrical.

The movable structure is similarly provided with a plurality of concave pockets 37 and 38 formed by transversely aligned, V-shaped recesses 39 in upwardly-directed edges of the members 33. As with the fixed structure, in the first three pockets 37 from the input end of the conveyor the edges of the recesses 39 are inclined at different angles to the horizontal whereas in the remaining two pockets 38 the edges are symmetrical: in this arrangement, however, the steeper edges in the pockets 37 face in the opposite direction to the potato feeding direction F.

As with a conventional walking beam, the conveyor 28 is operated by a cyclic movement of the movable structure with respect to the fixed structure along a closed path, which closed path includes an upward component wherein each pocket in the movable structure moves upwardly through a respective pocket in the fixed structure, a forward component in the feeding direction F, a downward component wherein each movable pocket moves downwardly through the next succeeding fixed pocket, and a return component in the opposite direction to the feeding direction. This action serves to transport a potato held in one fixed pocket to the next fixed pocket in line, and is repeated to obtain continuous transport of the potatoes along the conveyor.

Figure 2:
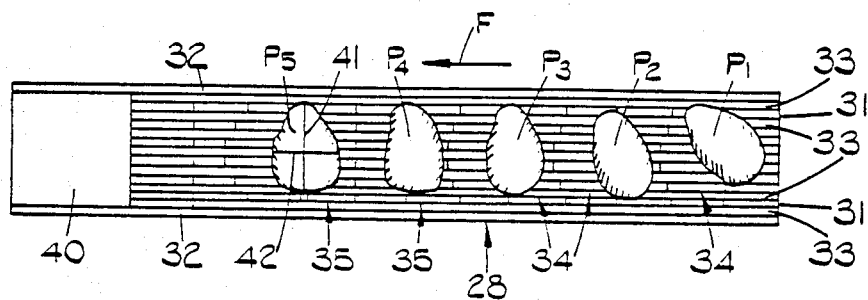
FIG. 2 is a plan view of a walking beam conveyor which forms part of the apparatus shown in FIG. 1.

When a potato is deposited in the first fixed pocket 34, it will have a random orientation and a random position transversely of the conveyor 28, as indicated at $P_1$ in FIG. 2. During its subsequent transport from pocket to pocket in the fixed structure, the concave nature of the pockets will cause the potato to move progressively to a central position transversely of the conveyor, and the V-shape of the recesses forming the pockets will cause the potato to become oriented so that its large dimension lies generally at right angles to the feeding direction F, as indicated at $P_2$ and $P_3$ in FIG. 2. This latter action is promoted by the specific shapes of the recesses 36 and 39 to such an extent that the potato will usually be properly oriented and positioned by the time it reaches the third fixed pocket 34: therefore, the pockets 35 in the fixed structure and the pockets 38 in the movable structure need to be shaped only to maintain the potato in this orientation and position, as indicated at $P_4$ and $P_5$ in FIG. 2. From the final pocket 35, the now quartered potato is deposited on an output ramp 40 down which the resultant pieces can roll into the output hopper 20.

The final fixed pocket 35 is disposed directly below the respective cutter 29 for the conveyor 28. The cutter 29 takes the form of a cruciform cutting blade, and reciprocates vertically to cut the potato at $P_5$ along two mutually perpendicular cutting planes 41 and 42 (see FIG. 2). The line of intersection between these planes passes generally centrally through the potato and is perpendicular to a horizontal plane containing the feeding direction F and the direction of orientation of the potato: more specifically, the cutting planes 41 and 42 are respectively perpendicular and parallel to the feeding direction F. Clearance for the part of the blade which cuts in the plane 41 is provided by a series of transversely aligned slots 43 in the members 31: the other part of the blade which cuts in the plane 42 passes between the innermost members 31. The cutter 29 is arranged to operate in synchronism with the conveyor 28.

Figure 3:
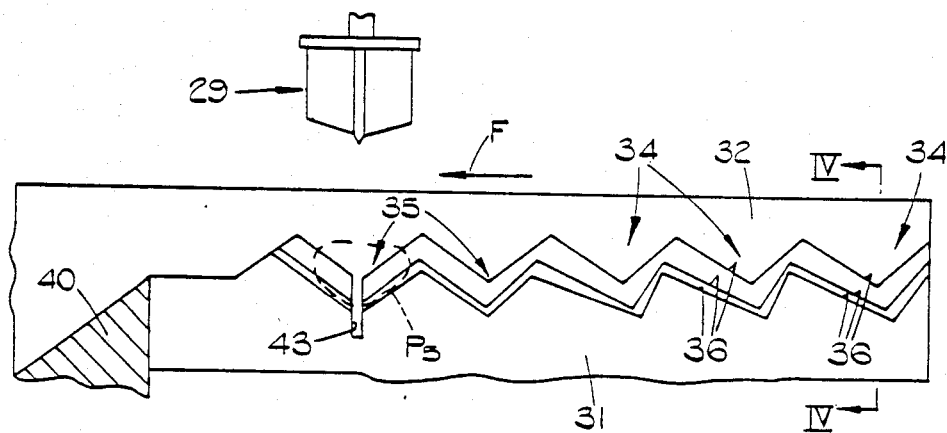
FIG. 3 is a sectional side view of a fixed structure of the walking beam conveyor, the section being taken along the line III—III in FIG. 4.
Figure 4:
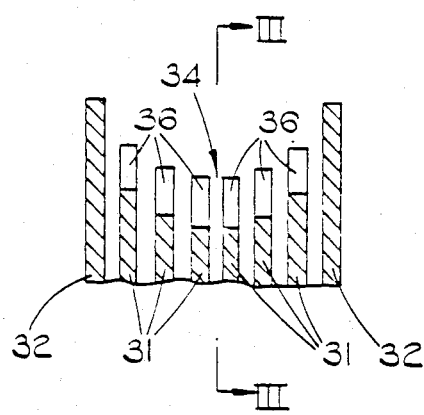
FIG. 4 is a section generally along the line IV—IV in FIG. 3.
Figure 5:
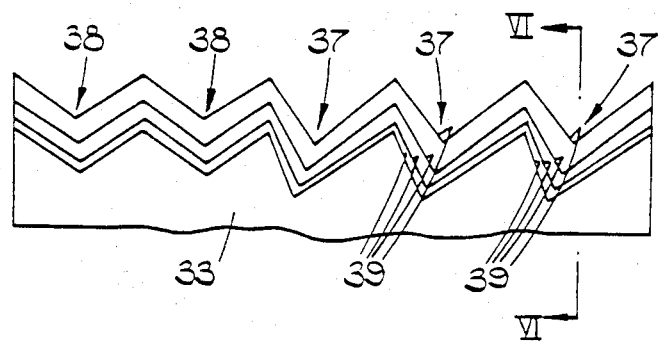
FIG. 5 is a sectional side view of a movable structure of the walking beam conveyor, the section being taken along the line V—V in FIG. 6.
Figure 6:
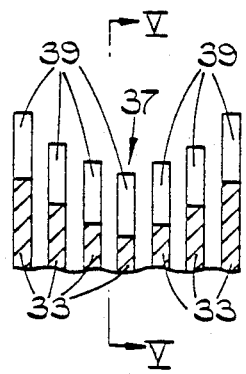
FIG. 6 is a section generally along the line VI—VI in FIG. 5.
Figure 7:
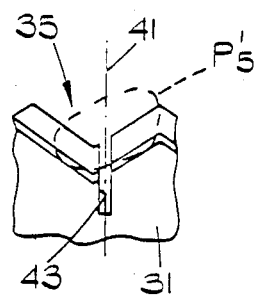
FIG. 7 shows a modification of the fixed structure illustrated in FIG. 3.

Because each potato is delivered to the cutter 29 in a predetermined disposition, the potato will always be cut into four roughly equal-sized pieces which are sufficiently small for further processing, irrespective of the size and shape of the potato. There is therefore no need to re-grade the potato pieces before they are passed on to the next stage in the process. Some potatoes when being transported by the conveyor 28 may tend to become tilted forwardly in the feeding direction so that they do not lie centrally of the final pocket 35, as indicated at $P_5'$ in FIG. 7. In order to prevent such potatoes from being cut unevenly, the position of the cutting plane 41 can be moved slightly rearwardly so that the slots 43 open into the recesses 36 slightly behind the apex in the V, rather than exactly onto the apex as illustrated in FIG. 3.

Figure 8:
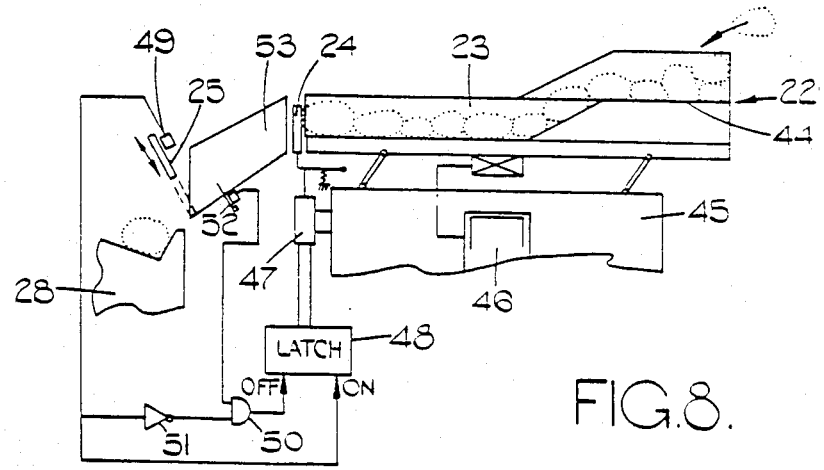
FIG. 8 is a schematic side view of a vibratory conveyor which also forms part of the apparatus shown in FIG. 1.

An example of the vibratory conveyor 22 is shown in FIGS. 8 and 9, and comprises an input section 44 onto which the potatoes drop from the aforementioned chute 21 and from which the aforementioned channels 23 (three in this case) lead at a lower level, the channels 23 themselves being V-shaped in transverse cross-section. The whole conveyor 22 is mounted on a fixed frame 45 and is vibrated by means of a vibratory drive 46. As mentioned above, gates 24 and 25 control the flow of potatoes from each channel 23 onto the respective conveyor 28. The gate 24 is operated by means of a solenoid 47 under the control of a latch circuit 48, while the gate 25 operates in synchronism with the cutter 29 associated with the respective conveyor 28. A limit switch 49 operated by the gate 25 is connected to an ON terminal of the latch circuit 48, and is also connected to one input of a logic OR gate 50 by way of an inverter 51. The other input of the OR gate 50 is connected to a limit switch 52 which is operated by the potatoes as they roll down a chute 53, while the output of the OR gate 50 is connected to an OFF terminal of the latch circuit 48.

In operation, closing of the gate 25 in sequence with operation of the aforementioned cutter 29 operates the limit switch 49 to turn the latch circuit 48 ON, so that the solenoid 47 opens the gate 24 and allows a potato to be vibrated off the conveyor 22 and onto the chute 53. This potato then triggers the limit switch 52, which turns the latch circuit 48 OFF so that the solenoid 47 closes the gate 24 to halt the flow of potatoes. When the gate 25 re-opens, the potato is allowed to fall onto the input end of the conveyor 28. In the event that no potato is vibrated off the conveyor 22 and onto the chute 53, the limit switch 49 turns the latch circuit 48 OFF to close the gate 24 when the gate 25 re-opens. This system therefore ensures that only one potato at a time is released onto the walking beam conveyor 28, and that such release is performed in synchronisation with the operation of the latter.

Figure 10:
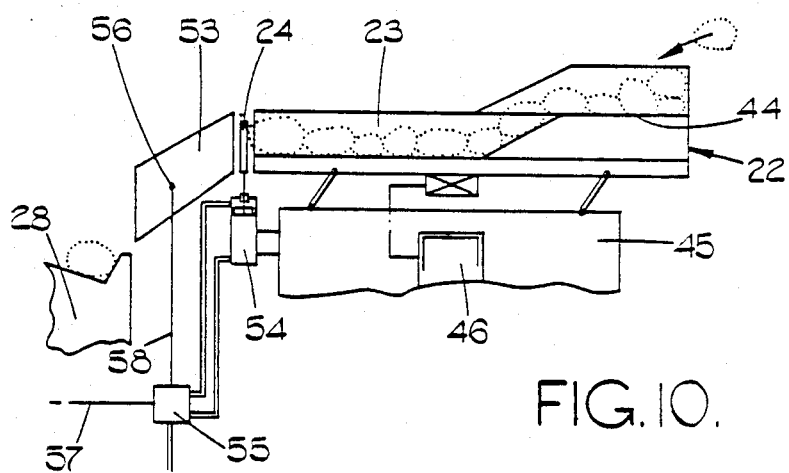
FIG. 10 is a schematic side view of a modified form of vibratory conveyor.

FIG. 10 illustrates an alternative arrangement wherein the gate 25 is omitted and the gate 24 is operated by a doube-acting fluid actuator 54. The supply of fluid, such as air, to the actuator 54 is controlled by a valve 55 in accordance with electrical signals from the conveyor 28 and from a sensor 56 on the chute 53 on respective lines 57 and 58. The signal on line 57 operates the valve 55 to open the gate 24 in fixed synchronisation with the cutter 29, while the gate 24 is closed when the sensor 56 detects that a potato has been vibrated off the conveyor 22 onto the chute 53.

Figure 11:
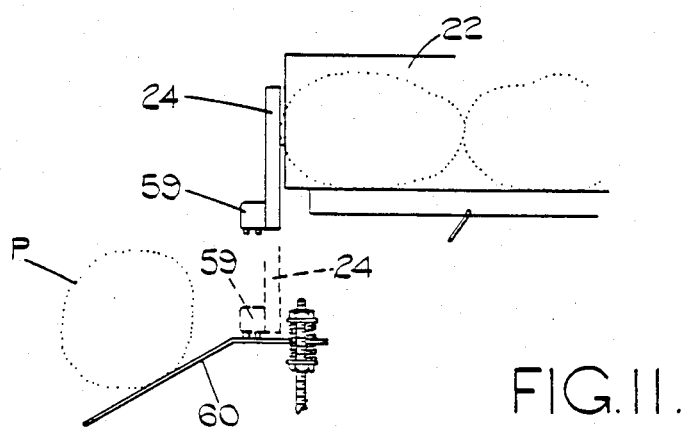
FIG. 11 illustrates part of another modified form of vibratory conveyor.

A simplified mechanism for controlling operation of the gate 24 is shown in FIG. 11. A cam (not shown) operates to lower the gate 24 at predetermined time intervals, whereupon a magnetic catch 59 on the gate engages a pivoted steel impact plate 60 to retain the gate in its open condition, as indicated in broken lines. As soon as a potato P drops from the conveyor 22 onto the impact plate 60, the engagement between the catch 59 and the plate 60 is released so that the gate 24 can return to its closed position.

I claim:

1. Potato processing apparatus wherein potatoes are fed by feeding means to a cutting station (27) where they are cut into pieces, comprising feeding means arranged to orient the potatoes in a predetermined manner as they are fed to the cutting station (27), said feeding means orienting the potatoes such that their longest dimensions be transverse to the direction of feeding (F) and also disposing the potatoes in a predetermined position transversely of the feeding direction, said feeding means comprising a walking beam conveyor (28) having first (34,35) and second (37,38) sets of pockets which are movable relative to each other and which are configured to promote said orientation and disposition of the potatoes as the potatoes are conveyed along the conveyor (28) by being transferred from pocket to pocket, the pockets of each set being defined by a series of transversely aligned recesses (36,39) in a plurality of mutually parallel members (31,33) with the members (31) defining the first set of pockets (34,35) being interleaved with the members (33) defining the second set of pockets (37,38), said recesses being formed by generally V-shaped slots (36,39) in upwardly directed edges of said mutually parallel members (31,33) and extending in the feeding direction (F) and having a pair of opposed edges which are inclined at different angles to the horizontal, with the steeper edges facing in one direction in one set of pockets (34) and in the opposite direction in the other set of pockets (37), and cutting means (29) at the cutting station (27) arranged to cut the oriented and positioned potatoes in at least one cutting plane (41 or 42) which passes generally centrally through said predetermined position.

2. Apparatus as claimed in claim 1, wherein one set of pockets (34, 35) is fixed and the other set of pockets (37, 38) is movable relative thereto.

3. Apparatus as claimed in claim 2, wherein the steeper edges of the recesses (36) in the fixed set of pockets (34) face in said direction of feeding (F).

4. Apparatus as claimed in claim 1, wherein for each pocket (34, 35, 37, 38) the recesses in the members (31,33) disposed centrally of the conveyor are deeper than the corresponding recesses in the members (31,33) disposed outboard thereof, so that the pockets are generally concave in transverse cross-section.

5. Apparatus as claimed in claim 1, wherein the cutting means (29) is arranged to cut the oriented and positioned potatoes at least in a cutting plane (42) which passes generally centrally through said predetermined position and which is substantially perpendicular to said predetermined direction.

6. Apparatus as claimed in claim 1, wherein the cutting means (29) is arranged to cut the oriented and positioned potatoes in two cutting planes (41, 42) which are substantially mutually perpendicular, a line of intersection between the cutting planes (41, 42) passing generally centrally through said predetermined position and being substantially perpendicular to a plane containing said predetermined direction and the direction of feeding (F).

7. Apparatus as claimed in claim 6, wherein the cutting means comprises a cruciform cutting blade (29) such that cutting of the oriented and positioned potatoes is performed simultaneously in both said cutting planes (41, 42).

8. Apparatus as claimed in claim 1, further comprising an input station (16) at which the potatoes are received, a grading station (18) which receives the potatoes from the input station (16) and which grades the potatoes into sizes respectively larger and smaller than a predetermined size, the potatoes larger than said predetermined size being directed into a first output channel (21) and the potatoes smaller than said predetermined size being directed into a second output channel (19), said feeding means (28) receiving the potatoes from the first output channel (21) and an output station (20) to which the potatoes from the second output channel (19) and the cut potatoes from the cutting station (27) are supplied for further processing.

* * * * *